United States Patent [19]

Peterson

[11] Patent Number: 4,505,688
[45] Date of Patent: * Mar. 19, 1985

[54] CONSTANT VELOCITY COUPLING HAVING LAMINATED ELASTOMERIC BEARINGS

[75] Inventor: Robert R. Peterson, Hudson, Mass.

[73] Assignee: Barry Wright Corporation, Newton Lower Falls, Mass.

[*] Notice: The portion of the term of this patent subsequent to Jun. 24, 1997 has been disclaimed.

[21] Appl. No.: 233,711

[22] Filed: Feb. 12, 1981

[51] Int. Cl.³ .............................................. F16D 3/16
[52] U.S. Cl. .................................. 464/111; 464/138; 464/905
[58] Field of Search ................. 464/138, 137, 112, 70, 464/71, 72, 905, 90, 111

[56] References Cited

U.S. PATENT DOCUMENTS

| 1,978,939 | 10/1934 | Guy | 464/137 X |
| 2,122,837 | 7/1938 | Guy | 464/137 X |
| 2,292,675 | 8/1942 | Thiry | 464/138 X |
| 2,752,766 | 7/1956 | Wildhaber | 464/70 |
| 2,760,359 | 8/1956 | Wildhaber | 464/70 |
| 2,995,907 | 8/1961 | Orain | 464/138 |
| 3,067,596 | 12/1962 | Caunt | 464/138 X |
| 3,304,743 | 2/1967 | Paulsen | 464/72 |
| 3,318,108 | 5/1967 | Cadiou | 464/71 |
| 4,208,889 | 6/1980 | Peterson | 464/138 |

FOREIGN PATENT DOCUMENTS

WO79/00033 1/1979 PCT Int'l Appl. .................. 464/90

OTHER PUBLICATIONS

"The Tri-Pot Universal Joint", J. M. Roethlisberger et al., Society of Automotive Engineers; International Automotive Engineering Congress; Detroit, Mi; Jan. 13-17, 1969, 690257, pp. 1-8.
"Constant Velocity Joints and Their Applications", S. L. Girguis et al., Technical Paper Series, Society of Automotive Engineers, Congress and Exposition Cobo Hall, Detroit, Mi; Feb. 27-Mar. 3, 1978, 780098, pp. 1-17.

Primary Examiner—John Petrakes
Assistant Examiner—Daniel P. Stodola
Attorney, Agent, or Firm—Milton E. Gilbert; Gary E. Ross

[57] ABSTRACT

A constant velocity, "Tri-Pot" type joint comprises first and second members respectively rotatable about first and second axes and a coupling for connecting the first and second members. The coupling comprises three trunnions rotatable with the first member. The trunnions have respective radial axes extending radially from and perpendicular to the first rotation axis and intersecting the first axis at a common intersecting point. The coupling also comprises rods connecting the trunnions to the second member, and laminated elastomeric bearings, disposed about the trunnions for carrying in compression torque transmitted between the first and second members and for carrying in shear axial misalignment of the first and second members and relative angular motion between the first and second members about the common intersecting point. In the preferred embodiment of the plunging joint the coupling includes laminated elastomeric bearings for accommodating in shear a telescoping motion applied to one of the members along its rotation axis with respect to the other of the members; and of the fixed joint includes laminated elastomeric bearings for carrying a telescoping load in compression.

9 Claims, 8 Drawing Figures

CONSTANT VELOCITY COUPLING HAVING LAMINATED ELASTOMERIC BEARINGS

The present invention relates generally to mechanical couplings and more particularly to an improved constant velocity, universal joint.

Universal joints have wide applications including their use in the power drive trains of marine vehicles; air vehicles, such as helicopters; and land vehicles. With the increased interest in front wheel drive automobiles, a great deal of interest is being generated in developing constant velocity couplings which provide highly efficient transmission of torque and energy. One such joint is the tri-axial joint commonly referred to as the "Tri-Pot" joint because it includes (1) a spider comprising three radially directed legs or trunnions extending from a central hub, each trunnion being fitted with a ball, and (2) a "pot" or housing comprising a center bore and three drive bores overlapping the center bore, and equidistantly radially spaced from and equiangularly spaced around the center axis of the center bore. The center bore and three drive bores respectively receive the hub, three trunnions and balls. For a discussion of the prior art Tri-Pot joint see, for example, Roethlisberger, J. M. and Aldrich, F. C.; "The Tri-Pot Universal Joint", Society of Automotive Engineers; International Automotive Engineering Congress, Detroit, Mich.; Jan. 13–17, 1969, 690257, pp. 1–8; and Girguis, Sobhyl et al; "Constant Velocity Joints and Their Applications" Technical Paper Series, Society of Automotive Engineers, Congress and Exposition Cobo Hall, Detroit, Mich.; Feb. 27–Mar. 3, 1978, 780098, pp. 1–17.

As described in the Roethlesberger at al article, a plurality of needle rollers is provided between the internal diameter of each ball and the outer diameter of the corresponding trunnion so as to allow the joint to telescope axially with relatively little force even under high driving torques. Spacer washers can be used under each ball between the trunnion and respective needle rollers to provide a surface on which the needle roller ends can bear.

The needle-trunnion configuration is a vital part of the prior art Tri-Pot design. In addition to permitting free rotation of the balls on the trunnion in response to telescoping loads, the needles must also permit axial motion of the ball relative to the trunnion which occurs when the driving and driven members of the joint are angularly misaligned.

The use of needle rollers within the bored housing involves precisely machined parts and results in a great deal of sliding friction between the interfitting parts. Such friction can create heat, and therefore mechanical wear as well as energy losses. Further, movement creating the sliding friction can cause as well as transmit undesirable vibration resulting in vibration-induced wear of the various parts. As a consequence the moving parts must be disposed within an adequate lubricant and the lubricated area must be adequately sealed, typically with a boot. While such a lubricant can help to reduce the problems associated with heating and vibration, they nevertheless are still present. Should the sealed enclosure be broken, such as the breaking of the seal boot (a relatively inexpensive element) the lubricant can easily leak and dry up leading to premature failure of the coupling joint (relatively expensive parts).

It is a general object of the present invention to provide a universal joint which substantially reduces or overcomes the problems associated with the Tri-Pot joint of the prior art.

Other, more specific objects of the present invention are to provide an improved joint of the type including radially directed trunnions which joint (1) requires no lubrication, (2) reduces the amount of mechanical vibration transmitted through the joint, (3) reduces the number of machined parts, (4) eliminates the need for needle rollers, (5) is relatively inexpensive to make, and (6) provides a more energy efficient transmission of torque.

These and other objects are achieved by an improved constant velocity joint comprising first and second members respectively rotatable about first and second axes, and coupling means for connecting the first member to the second member. The coupling means comprises at least two trunnions rotatable with the first member, three trunnions being preferred. The trunnions have respective radial axes extending radially from and perpendicular to the first axis equiangularly around the first axis and intersecting the first axis at a common intersecting point.

The joint further includes connecting means for connecting the trunnions to the second member. The connecting means includes laminated elastomeric bearings for carrying in compression torque transmitted between the two members and accommodating in shear axial misalignment of the members and relative angular motion between the members about the common intersecting point. Two embodiments of the improved joint are described, one being a fixed joint where laminated elastomeric bearing means transport telescoping loads in compression and a plunging joint where laminated elastomeric bearing means accommodate telescoping loads in shear.

Other features and many attendant advantages of the invention are disclosed in or rendered obvious by the following detailed description taken in connection with the accompanying drawings wherein.

In the drawings, the same numerals are used to designate like parts.

Figures 1, 2:
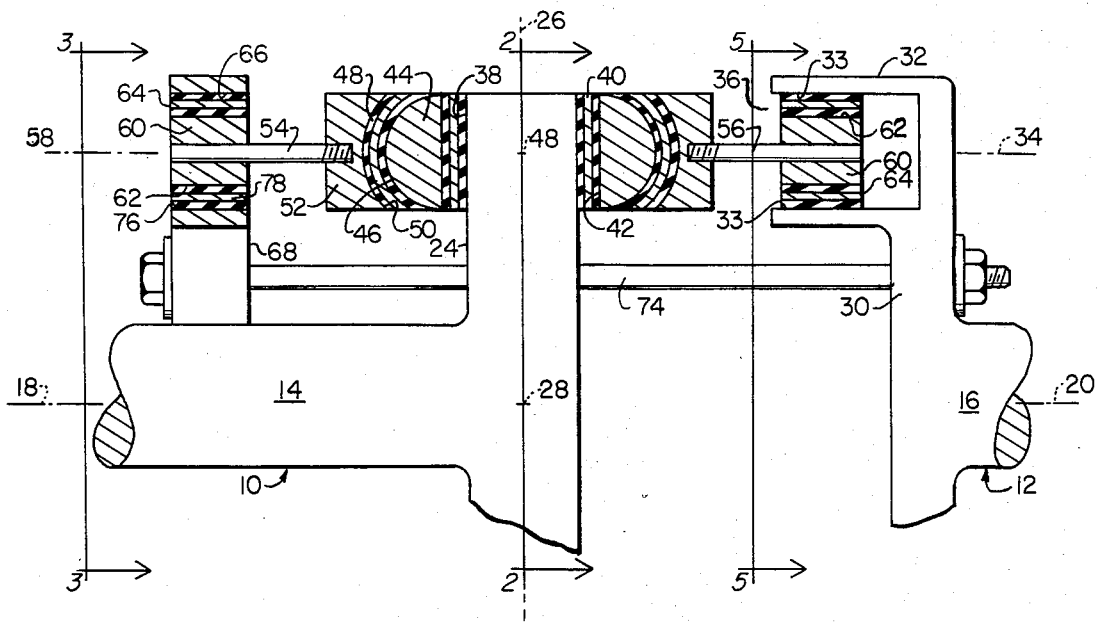
FIG. 1 is a longitudinal axial cross-sectional view of the preferred embodiment of the plunging joint of the present invention.
FIG. 2 is a radial cross-sectional view taken along line 2—2 of FIG. 1.
Figure 3:
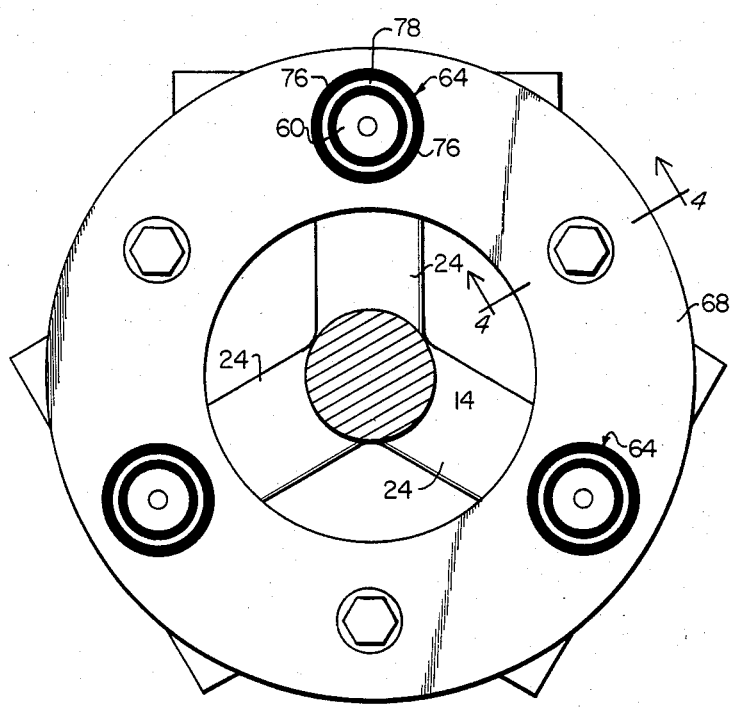
FIG. 3 is a radial cross-sectional view taken along line 3—3 of FIG. 1.
Figure 4:
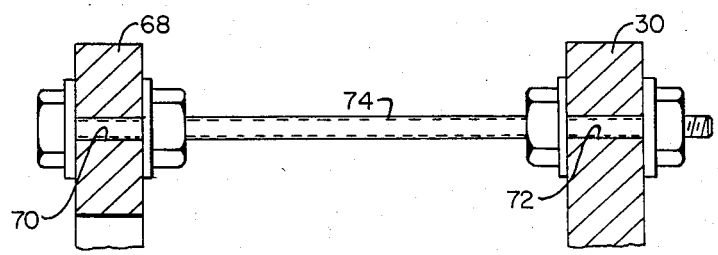
FIG. 4 is a cross-sectional view taken along line 4—4 of FIG. 3.
Figure 5:
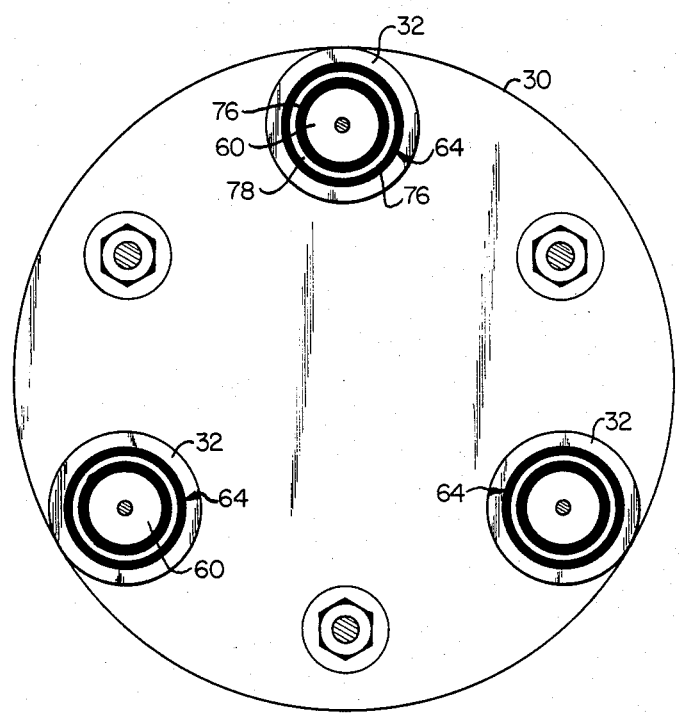
FIG. 5 is a radial cross-sectional view taken along line 5—5 of FIG. 1.
Figure 6:
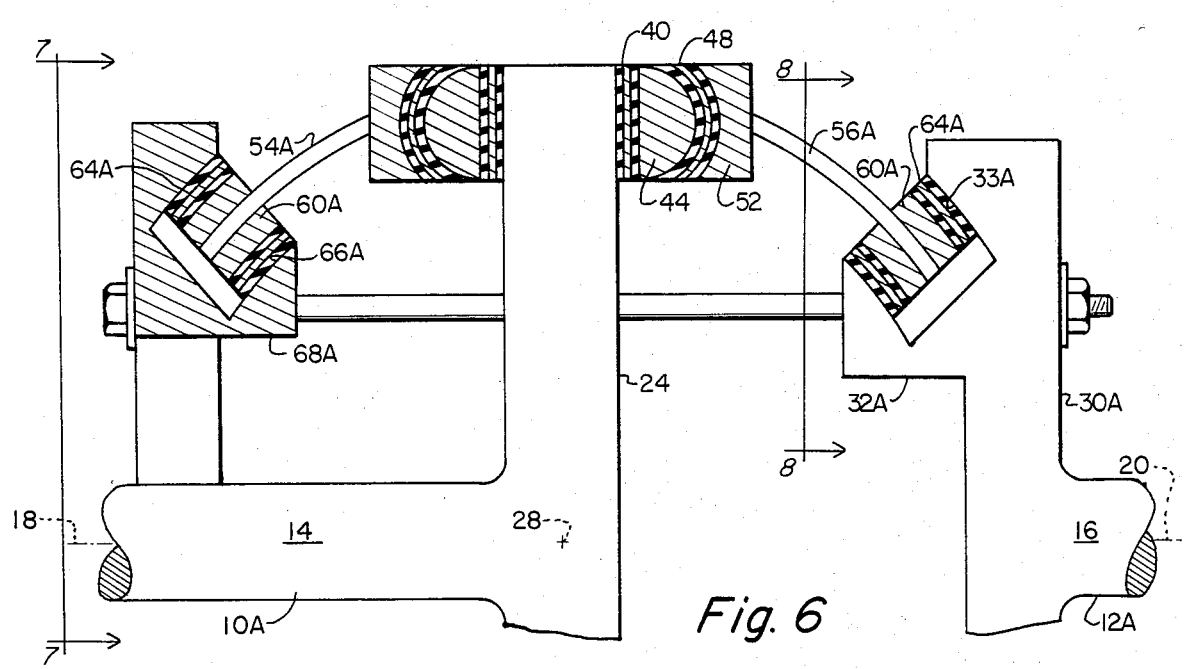
FIG. 6 is a longitudinal, axial cross-sectional view of the preferred embodiment of the fixed joint of the present invention.

Numerals 10 and 12 are used to respectively designate the first and second rotatable members. Where member 10 is the driving member, torque is transmitted from the left to the right as seen in Figs. 1 and 6. It should be understood that the joint will work equally as well if members 10 and 12 were respectively used as the driven and driving members so that torque is transmitted from the right to the left in FIGS. 1 and 6. Each member 10 and 12 includes a respective shaft 14 and 16 mounted, by any suitable means such as journals (not shown), for rotation about the respective rotation axes 18 and 20. The shafts may be mounted such that their rotation axes 18 and 20 are in substantial alignment (as shown in the Figs.), or at an angle with respect to one another.

As shown in FIGS. 1–5 of the drawings, the driving member 10 includes a section comprising two or more trunnions or legs, with three being preferred. The three trunnions or legs 24 are substantially identical with each being radially directed along a radial line 26. The latter are perpendicular to and equiangularly spaced 120° apart around the rotation axis 18 and intersect the latter at the common intersecting point 28. The preferred second member 12 includes an annular flange or extension 30 having its general plane normal to the rotation axis 20 and including three cylindrical cupped sections 32 each having an inner cylindrically curved surface 33. As best shown in FIG. 1, surfaces 33 each have a central cylindrical axis 34 parallel to the rotation axis 20. The axes 34 of surfaces 33 are radially spaced equidistantly from the rotation axis 20 and equiangularly spaced 120° apart around the rotation axis 20. Each cylindrical section 32 is open at least at one end 36.

Although the trunnions 24 are shown integrally formed with the shaft 14 of member 10, extension 30 is shown integrally formed with the shaft 16 of member 12, and cylindrical sections 32 are shown integrally formed with extension 30, it should be appreciated that each member can comprise several parts suitably assembled to provide essentially the structure shown.

Each trunnion 24 preferably includes at its outer radial end an outer cylindrical surface 38 having its axis of revolution coincident with the corresponding radial line 26. Surface 38 contacts the inner cylindrical surface of a laminated elastomeric cylindrical bearing unit 40, the latter also being coaxially aligned with the corresponding radial line 26.

The outer cylindrical surface of cylindrical bearing 40 contacts the inner cylindrical surface 42 of the inner annular ring 44. Annular ring 44, also being coaxially aligned with the respective radial line 26, has an outer convex spherically curved surface 46, the latter having its center of revolution 49 on the corresponding radial line 26. The outer convex spherically curved surface 46 of inner ring 44 contacts and mates with the spherically-curved concave surface of the laminated elastomeric spherically-sectioned bearing unit 48. The outer spherically-curved convex surface of bearing unit 48 contacts and mates with the inner concave spherically curved surface 50 of an outer annular ring 52. A pair of elongated rods 54 and 56 are each secured at one of their respective ends at diametrically opposite points of each annular ring 52 in any suitable manner. For example, screw threaded receiving holes can be provided at diametrically opposite points of the ring 52 for receiving the screw threaded ends of each rod. Rods 54 and 56 have their elongated axes each intersecting the center of revolution 49 with the elongated axis of rod 56 being aligned with axis 34 of a corresponding one of the cylindrical sections 32 and positioned parallel to axis 20 of member 12. The elongated axis 58 of rod 54 is positioned parallel to the axis 18 of member 10.

The end of each rod 54 and 56 opposite the end attached to outer ring 52 is secured in any known manner to a corresponding cylindrical ring 60 coaxially mounted about the corresponding axis 34 and 58 and having a cylindrically curved outer surface 62. Each cylindrical ring 60 corresponding to each rod 56 is secured in the cylindrical sections 32 with the elastomeric laminated cylindrical bearing unit 64. Specifically, the cylindrical bearing unit 64 is secured between the outer surface 62 of the cylindrical ring 60 and the inner cylindrical surface 33 of section 32. Sufficient clearance is provided within the section to allow for axial movement of the rod along the axis 34. In a similar manner the end of rod 54 and corresponding cylindrical ring 60 is coaxially secured with respect to the axis 58 in a corresponding aperture 66 of the annular ring 68.

More specifically, ring 68 is mounted about the shaft 14 of member 10 coaxially with the axis 18. Ring 68 includes three apertures 66 corresponding to the three rods 54. Apertures 66 are equiangularly spaced 120° around the ring, each aperture being coaxial with a respective axis 58.

The ring 68 is fixedly secured to the extension 30 by any suitable means so that the ring is substantially parallel to the extension. Preferably, the ring includes at least three holes 70, each disposed between a different pair of the apertures 66. Similar holes 72 are provided in the extension 30 between each pair of cylindrical extensions 32. Bolts 74 are secured in the holes 70 of the ring 68 and the holes 72 of the extension 30 so that the bolts hold the ring 68 in place and prevent relative axial movement of the ring 68 relative to the extension 30.

In the embodiment shown in FIGS. 1–5 the laminated elastomeric bearing units 40, 48 and 64 are all disposed between and secured to the opposing bearing surfaces and accordingly take the general shape of those surfaces. The laminated bearing units 40, 48 and 64, each comprise a plurality of alternating layers 76 and 78 respectively of resilient and substantially non-extensible materials. Each laminated bearing unit is preferably a "high compression laminate" bearing unit. The resilient layers 72 are made of an elastomeric material, such as rubber or certain plastics, while the non-extensible material of layers 74 are made of, for example, reinforced plastic, metal or a metal alloy such as stainless steel. The alternating layers are preferably bonded together, and to the opposing bearing surfaces by, for example, a suitable bonding cement. The particular design of each of the laminated bearings described above and hereinafter is largely dependent upon the intended use of the joint. The size, thickness and number of the layers of each bearing and the durometer of each layer of elastomeric material depends, for example, on the particular compression loads to be expected. The advantages of such bearings are described in my U.S. Pat. No. 4,208,889 issued June 24, 1980. Generally, by using such bearings, undesirable vibration can be at least partially dampened and noise, as well as vibration-induced wear and stress reduced. Further, due to the resiliency of the elastomeric material, each bearing provides counteracting restoring forces to uneven compression and shearing loads. Of importance, use of such laminated bearings eliminates the costly needs associated with providing lubrication between the various bearing surfaces.

In operation when torque is applied to the driving member, the torque will be carried by the joint with each of the cylindrical bearing units 40, spherical bearing units 48, and cylindrical bearing units 64 in compression. Should angular misalignments occur between axes 18 and 20 about the intersection point 28 of the radial lines 26, such misalignment will be carried by bearings 40 and 48 in shear. Plunging motion in response to telescoping loads (where relative axial movement occurs between member 10 and the member 12 along their respective rotation axes), the loads will be carried by the bearing units 64 in shear. Finally, the arrangement of each rod 54, corresponding annular ring 68 and bearing unit 64, as well as the arrangement of each rod 56, corresponding cylindrical cupped section 32 and bearing unit 64, functions to reduce the "cantilever effect" produced by torsional loading of a coupling. Without these arrangements such as torsional loading would cause the respective axes 34 and 58 to cock and thus become non-parallel with the rotation axes 18 and 20.

The plunging joint of FIGS. 1–5 thus described is useful when it is desirable to accommodate telescoping loads with the elastomeric bearing units in shear, and therefore the joint can be used, for example as the inboard joint of an automotive front wheel drive system. However, in some applications, such as the outboard joint of an automotive front wheel drive system, it is desirable to provide laminated elastomeric bearings which carry such telescoping loads in compression, thereby eliminating, for example, motion across the fix joint which may otherwise result in outward axial translation of the wheels along their axle.

Figure 8:
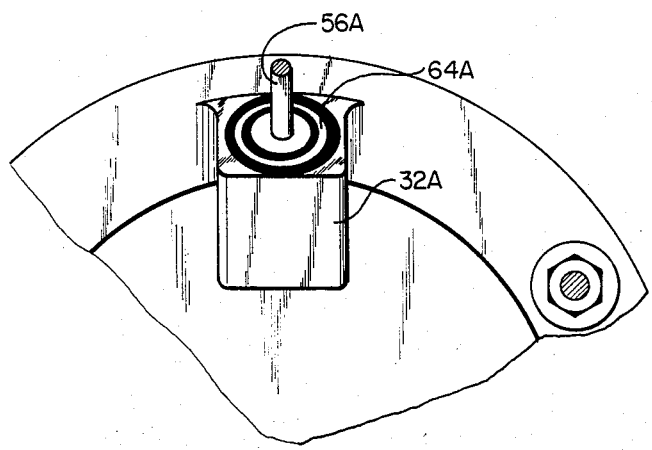
FIG. 8 is a cross-sectional view partially cut away taken along line 8—8 in FIG. 6.
Figure 7:
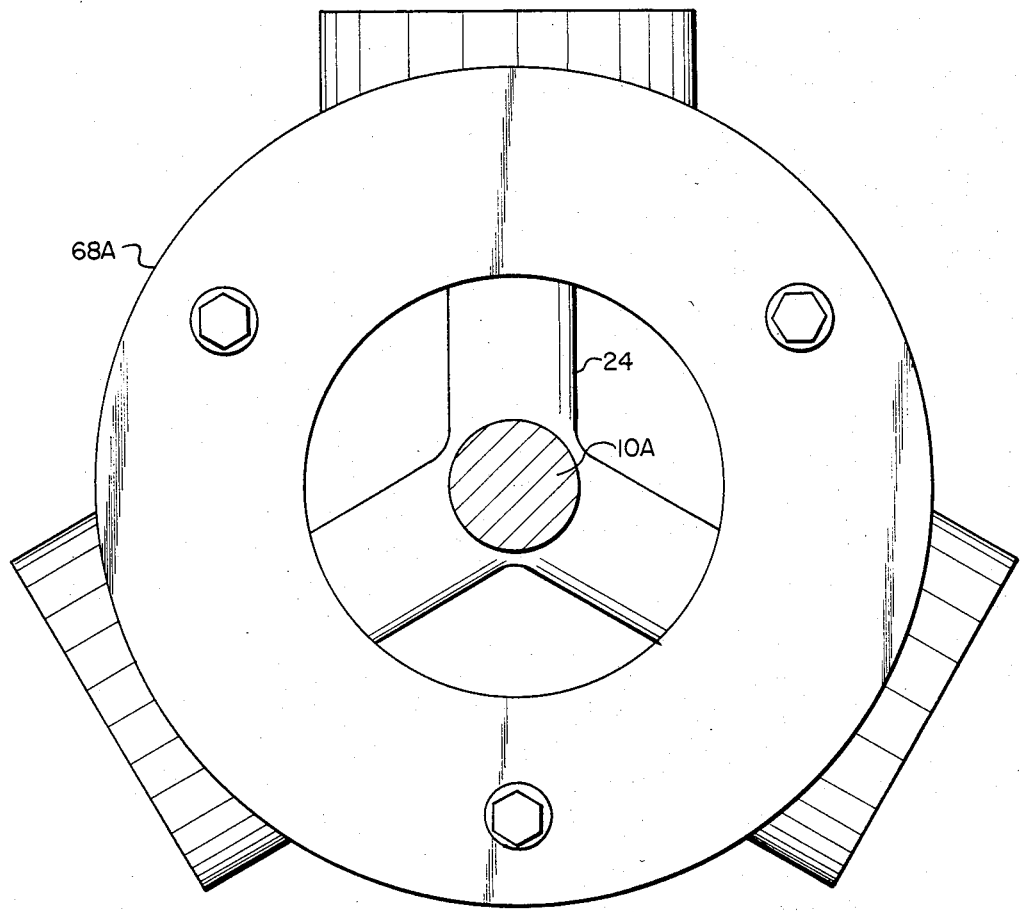
FIG. 7 is a radial cross-sectional view taken along line 7—7 of FIG. 6.

Accordingly, the embodiment of the plunging joint shown in FIGS. 1–5 can be modified to provide a fixed joint such as the one shown in FIGS. 6–8. In FIGS. 6–8, the elongated rods 54 and 56 of FIGS. 1–5 are modified as shown at 54A and 56A. The elongated axis of each rod 54A and 56A is curved about a circular path having its center of curvature at intersection point 28 and in a plane which includes the respective rotation axis 18 and 20 of the corresponding shaft 14 and 16. Each cylindrical ring 60A and corresponding cylindrical surface 33A of cupped section 32A and laminated elastomeric cylindrical bearing 64A is modified so that the cylindrical axis of the ring 60A, surface 33A and unit 64A follows the circular path of the elongated axis of the corresponding rod 54A and 56A to which it is attached. The apertures 66A of ring 68A is similarly modified as shown respectively in FIGS. 6–8. The bearing units 64A are thus circular in cross-section and have their elongated axis coaxial with the axis of the respective surface 33A or aperture 66A.

The remaining portions of the fixed joint of FIGS. 6–8 are essentially the same as the corresponding parts of the plunging joint of FIGS. 1–5.

In operation, the fixed joint of FIGS. 6–8 will still accommodate in shear angular motion of the shafts about the common intersecting point 28, and motion resulting from axial misalignment. However, when a telescoping load is applied to one of the members 10A and 12A, wherein the members are forced toward or away from one another along their respective rotation axes 18 and 20, such loads will be carried in compression by the bearings 40, 48 and 64A. Since the laminated elastomeric bearing units provide relatively little movement when compressed, the members 10A and 12A will remain substantially relatively fixed in their relative axial positions.

It will be appreciated that the two joints disclosed, i.e., the plunging joint of FIGS. 1–5 and the fixed joint of FIGS. 6–8 can be coupled in tandem and thus accommodate parallel misalignment in addition to axial and angular misalignment.

The invention has various advantages. By utilizing laminated elastomeric bearings, the manufacture of both the plunging and fixed joints becomes much simpler due to the elimination of the requirements of finely manufactured parts, such as the needle rollers of the prior art. Further, the lubrication requirements are eliminated, substantially all friction and heat between the bearing surfaces are substantially eliminated reducing energy losses, generated noise and vibration is substantially reduced, manufacturing tolerance requirements relaxed, and backlash at low reverse torques is substantially eliminated. Still other advantages will be obvious to persons skilled in the art.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A constant velocity joint comprising
   a first member rotatable about a first rotation axis;
   a second member rotatable about a second rotation axis;
   coupling means for connecting said first and second members, said coupling means comprising
   (1) three trunnions rotatable with said first member about said first rotation axis, said trunnions having respective radial axes extending radially from and perpendicular to said first rotation axis equiangularly around said first axis and intersecting said first axis at a common intersecting point, and
   (2) connecting means for connecting said trunnions to said second member, said connecting means comprising laminated elastomeric bearing means for carrying in compression torque transmitted between said first and second members and carrying in shear axial misalignment of said first and second members and relative angular motion between said first and second members, and
   (3) wherein said laminated elastomeric bearing means includes a plurality of cylindrical laminated elastomeric bearing units each coupled between said first and second members and to one of the trunnions coaxially with the radial axis of the respective trunnion and radially spaced from said common intersecting point, whereby said cylindrical laminated elastomeric bearing units carry torque transmitted between said first and second members in compression and motion resulting from angular, misalignment in shear.

2. A joint according to claim 1, wherein said connecting means includes laminated elastomeric bearing means for carrying in shear a telescoping load applied to one of said members along its rotation axis with respect to the other of said members.

3. A joint according to claim 1, wherein said connecting means includes laminated elastomeric bearing means for carrying in compression a telescoping load applied to one of said members along its rotation axis with respect to the other of said members.

4. A joint according to claim 1, wherein said laminated elastomeric bearing means includes a plurality of spherical laminated elastomeric bearing units each coupled to said first and second members and disposed coaxial with the radial axes of a respective one of said trunnions so as to carry in compression torque transmitted between said first and second members, and in shear motion resulting from angular misalignment between said first and second members and relative angular movement between said first and second members.

5. A joint according to claim 4, wherein said connecting means includes an annular ring disposed between each of said cylindrical bearing units and a corresponding one of said spherical bearing units so that each said cylindrical bearing unit is radially spaced from the corresponding one of said spherical bearing units with respect to the radial axis of the corresponding one of said trunnions.

6. A joint according to claim 5, further including
(a) a second annular ring mounted coaxially with the radial axis of each said trunnion and radially outwardly spaced from the corresponding cylindrical and spherical bearings units;
(b) a third annular ring disposed around said first member and axially spaced along said first axis from said trunnions;
(c) at least three cylindrical laminated bearing units, each corresponding to one of said trunnions and mounted to said third annular ring and equiangularly spaced around and radially spaced from said first axis;
(d) at least three other cylindrical bearing units, each corresponding to one of said trunnions and mounted to said second member and equiangularly spaced around and radially spaced from said second axis;
(e) means for securing said third annular ring to said second member so as to substantially prevent axial movement between said third annular ring and second member; and
(f) a pair of elongated rod means respectively connected to diametrically opposing points of each said second annular ring, each said elongated rod means defining an elongated axis, one of said rod means of each pair being connected coaxially with a separate one of said cylindrical bearing units mounted to said third annular ring so that said cylindrical bearing unit is in shear when said rod means moves along its axis relative to said cylindrical bearing unit and the other of said rod means of each pair being connected coaxially with a separate one of said cylindrical bearing units mounted to said second member so that said cylindrical bearing unit is in shear when said rod means moves along its axis relative to said separate bearing unit.

7. A joint according to claim 6, wherein said third annular ring includes at least three apertures for receiving the corresponding cylindrical bearing unit mounted to said annular ring, and said second member includes a flange, said flange including at least three cylindrical mounts for receiving the corresponding cylindrical bearing units mounted to said second member.

8. A joint according to claim 6, wherein the elongated axis of said rod means connected to the cylindrical bearing units mounted to said third annular ring extend substantially parallel to said first axis and the elongated axis of said rod means connected to the cylindrical bearing units mounted to said second member extend substantially parallel to said second axis so that the cylindrical bearing units mounted to said third annular ring and said second member carry in shear a telescoping load applied to one of said members along its rotation axis with respect to the other of said members.

9. A joint according to claim 6, wherein the elongated axes of said rod means are all circular about the common intersecting point so that said cylindrical bearing units carry in compression a telescoping load applied to one of said members along its rotation axis with respect to the other of said members and carry in shear angular motion between said first and second members about said common intersecting point.

* * * * *